United States Patent [19]

Brems

[11] 4,440,291

[45] Apr. 3, 1984

[54] DRIVE MECHANISM FOR RECIPROCATING AND MULTIPLE STEP INDEX DEVICES

[76] Inventor: John H. Brems, Apt. 16-D, 2800 S. Ocean Blvd., Boca Raton, Fla. 33432

[21] Appl. No.: 347,542

[22] Filed: Feb. 10, 1982

[51] Int. Cl.³ ............................................ B65G 25/00
[52] U.S. Cl. ...................................... 198/488; 74/816
[58] Field of Search ............... 198/486, 488, 621, 774, 198/766; 74/816

[56] References Cited

U.S. PATENT DOCUMENTS

| | | | |
|---|---|---|---|
| 3,719,270 | 3/1973 | Budris et al. | 198/488 |
| 3,799,717 | 3/1974 | Nedoh | 198/486 |
| 3,817,370 | 6/1974 | Cox | 198/766 |
| 4,075,911 | 2/1978 | Brems | 74/816 |

Primary Examiner—Trygve M. Blix
Assistant Examiner—Jesus D. Sotelo
Attorney, Agent, or Firm—Barnes, Kisselle, Raisch, Choate, Whittemore & Hulbert

[57] ABSTRACT

A drive mechanism for reciprocating and multiple step index devices which includes a modified higher harmonic addition which can achieve a significantly longer substantially vertical path at the beginning and end of the overall longitudinal path which assists in unloading and loading workpieces from and into various fixtures.

7 Claims, 18 Drawing Figures

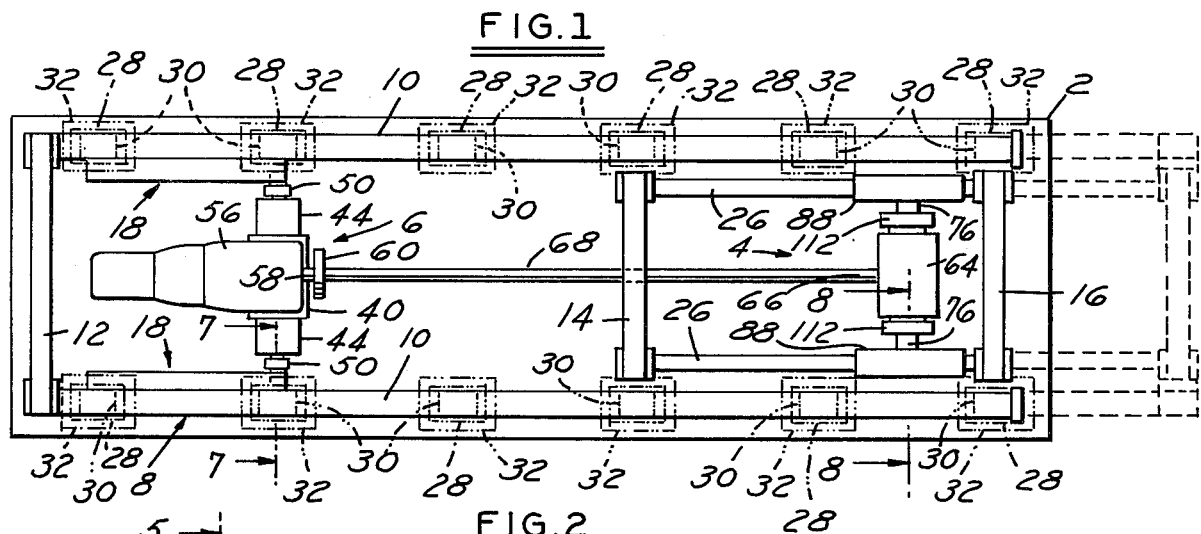
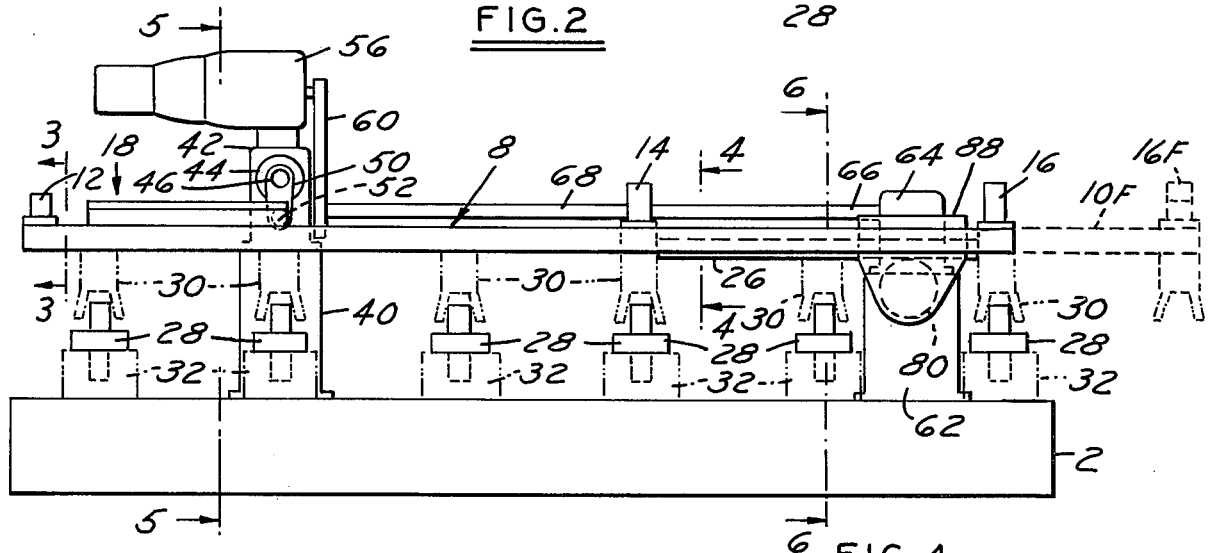
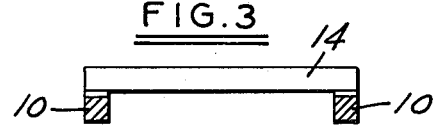
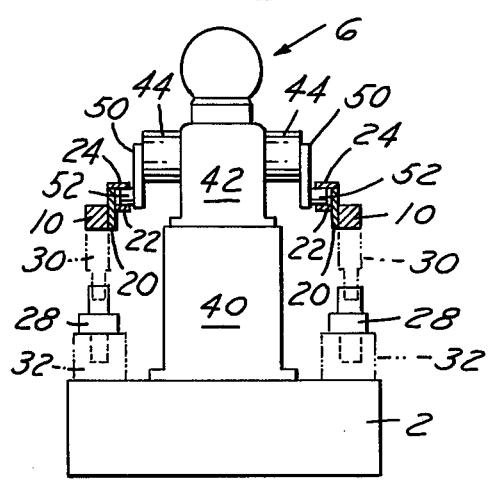
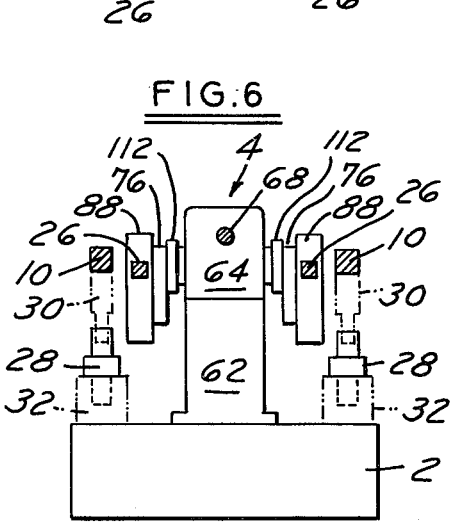

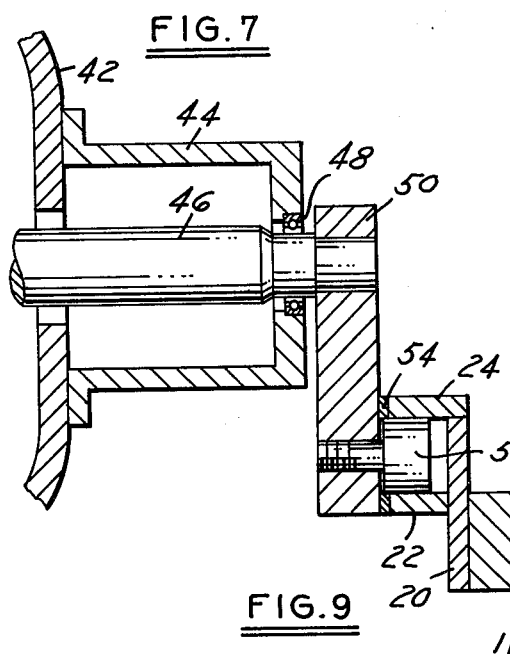
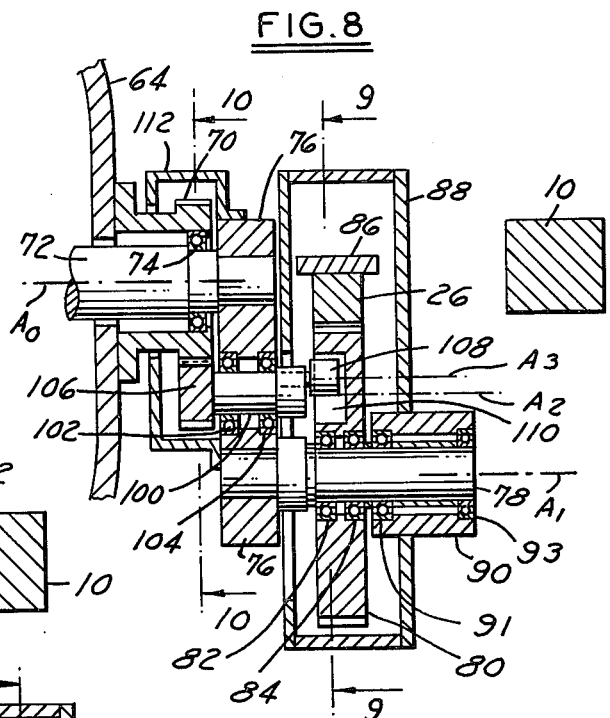
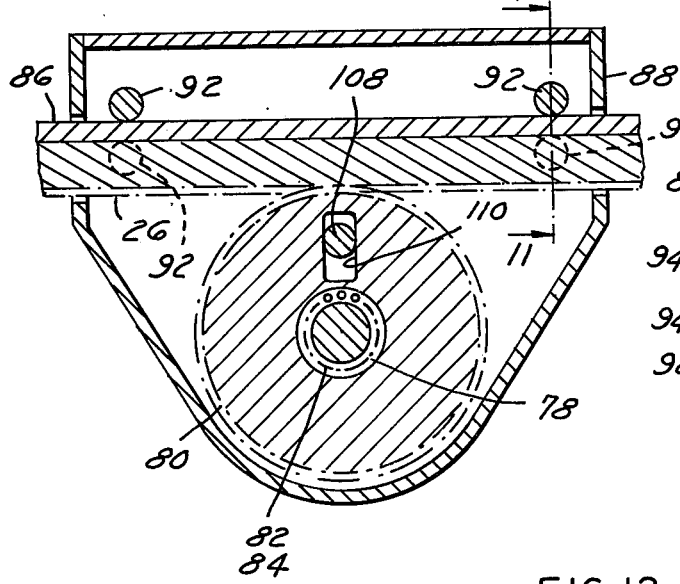
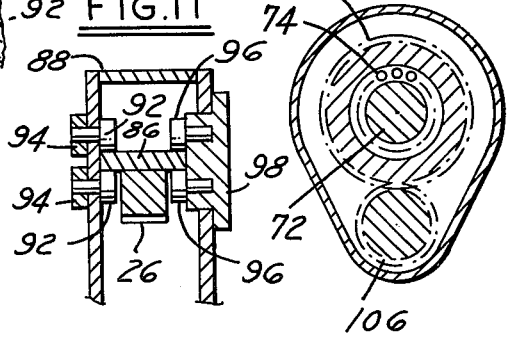
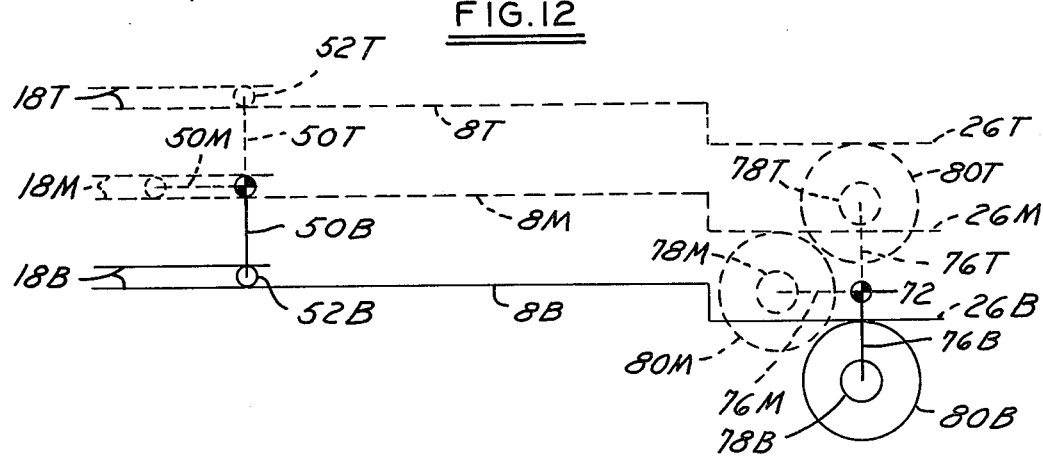

DRIVE MECHANISM FOR RECIPROCATING AND MULTIPLE STEP INDEX DEVICES

FIELD OF INVENTION:

Apparatus for transporting workpieces from one station to another in a continuous lift, transfer, and lower motion.

BACKGROUND OF INVENTION:

In my existing U.S. Pat. No. 4,075,911, it was shown how higher harmonic components added to a linear cycloidal movement system could significantly modify the kinematic characteristics.

It is one object of this invention to apply the same technique of higher harmonic addition to modify the two dimensional path of a cycloid to achieve modified paths more suitable for part transferring. Specifically, a path having higher harmonic addition can achieve a significantly longer, substantially vertical path at the beginning and end of the stroke, which is of considerable value in unloading workpieces from and into many types of fixtures. It is also of value in achieving higher vertical strokes in relation to the horizontal stroke as compared to a pure cycloid.

These and other objects and features of the invention will be apparent in the following description and claims in which the invention is described and details are provided to enable a person skilled in the art to make and use the invention.

BRIEF DESCRIPTION OF THE DRAWINGS:

DRAWINGS accompany the disclosure and the various views thereof may be briefly described as:

FIG. 1, a plan view of a machine having a transfer system utilizing this invention;

FIG. 2, a side view of the machine of FIG. 1;

FIG. 3, a section taken on line 3—3 of FIG. 2;

FIG. 4, a section taken on line 4—4 of FIG. 2;

FIG. 5, a section taken on line 5—5 of FIG. 2.

FIG. 6, a section taken on line 6—6 of FIG. 2;

FIG. 7, an enlarged section taken on line 7—7 of FIG. 1;

FIG. 8, an enlarged section taken on line 8—8 of FIG. 1;

FIG. 9, a section taken on line 9—9 of FIG. 8;

FIG. 10, a section taken on line 10—10 of FIG. 8;

FIG. 11, a section taken on line 11—11 of FIG. 9;

FIG. 12, a schematic diagram qualitatively illustrating the parallel lifting arrangement between the slave and primary transfer drives;

Figure 13:
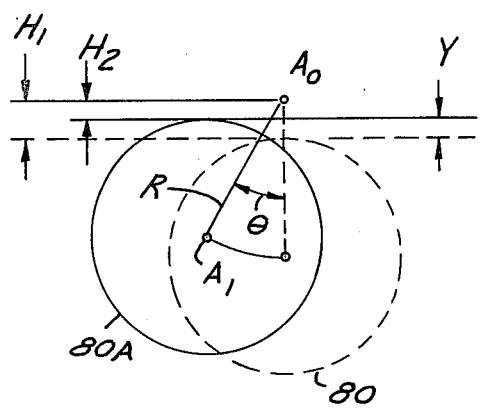
FIG. 13, a schematic diagram for determining the vertical position parametric equation.

DETAILED DESCRIPTION OF THE INVENTION AND THE MANNER AND PROCESS OF USING IT:

REFERRING TO FIGS. 1-6, a base 2 supports a primary transfer drive 4 and a slave transfer drive 6. Both transfer drives 4 and 6 together support and drive a transfer ladder assembly 8 through a unique continuous, predetermined curved path which may simply be described as being comprised of a lift portion, a forward transfer portion, and a lowering portion, whose technique will be subsequently described in detail. The transfer ladder assembly 8 is comprised of two longitudinal members 10, which are cross connected by three cross members 12, 14 and 16, suitably bolted to the longitudinal members 10 to form a rigid assembly.

A channel assembly 18, made up of three plates 20, 22 and 24 (FIG. 5) is mounted on each of the longitudinal members 10, and forms the means to support the transfer ladder assembly 8 from the slave transfer drive 6 as will be subsequently described.

Two gear racks 26 are mounted between the cross members 14 and 16; they are mounted parallel to but spaced from the longitudinal members 10. It is through these gear racks 26 that the transfer ladder assembly 8 is supported from and driven by the primary transfer drive 4, as will be subsequently described.

A series of workpiece transfer fingers 28 or hands 30 of conventional design are mounted on each longitudinal transfer member 10 on a pitch distance equal to the transfer distance. A series of workpiece holding fixtures 32 on the base 2, also longitudinally spaced at a distance equal to the transfer distance, hold the workpiece while various operations are performed in each station. It is the purpose of the mechanism, which is the subject matter of this invention to lift the workpieces 28 substantially vertically upward out of the fixtures 32, transport them forward one station, and then to lower the workpieces substantially vertically downward at the next station fixtures.

The slave transfer drive, FIGS. 1, 2, 5, and 7, is comprised of a riser 40 mounted on the base 2, which supports a gear reducer 42. Special tubular extensions 44 are bolted to each side of the gear reducer to support the double ended output shaft 46 (FIG. 2) through outboard support bearings 48 (FIG. 7). A crank 50 is splined to each end of the output shaft 46 and in turn each supports a roller 52 on an axis parallel to the axis of the shaft, but at a distance, R, therefrom. Each of the two rollers 52 engage one of the channel assemblies 18 on the transfer ladder assembly 8 made up of plates 20, 22 and 24. A thrust washer 54 operates between the outside face of each crank 50 and the edges of plates 22 and 24 to establish the transverse position of the transfer ladder assembly 8. A motor 56 is mounted on top of the gear reducer 42 and drives its input shaft 58 through belts and pulleys 60.

It will be understood that the enlarged section of FIG. 7 is only a partial section showing only half of the total slave transfer drive, the other half being symmetrically opposite.

The primary transfer drive, FIGS. 1, 2, 8, 9, 10 and 11, is comprised of a riser 62 mounted on the base 2 which supports a gear reducer 64. The input shaft 66 of this gear reducer 64 is directly connected to the input shaft 58 of the gear reducer 42 through coupling shaft 68; therefore, the input shafts 58 and 66 of the two reducers 42 and 64 rotate in synchronism. The reduction ratios of both reducers 42 and 64 are identical; therefore, their output shafts also rotate in synchronism.

A stationary gear 70, FIG. 8, is bolted to each side of the gear reducer 64 concentric with each output shaft 72; the inside of each gear 70 carries a bearing 74 to provide additional outboard support for the output shaft 72. A crank 76 is splined to each of the output shafts 72 rotating about an axis $A_0$. A crankpin 78, on an axis $A_1$, parallel to and displaced from the axis $A_0$, is fastened to the crank 76; the distance from the axis $A_0$ to $A_1$ is exactly the same as the distance R from the axis of roller 52 to the axis of output shaft 46 of gear reducer 42 on the slave drive assembly.

A drive gear 80 is journalled on the crankpin 78 through bearings 82 and 84; this drive gear 80 meshes with a rack 26, previously noted. It will again be understood that the section of FIG. 8 represents only half of the total primary drive system, the other half being symmetrically opposite. A guide plate 86 is mounted parallel to and bolted to the rack 26. A floating frame 88, which is an assembly, made up of components, bolted and welded together, has a hub 90 which is journalled on the crankpin 78 through bearings 91 and 93. Two sets of four rollers are mounted to the floating frame 88 and engage the guide plate 86 bolted to the rack 26 (FIG. 11). Four of these rollers 92 are directly bolted to the floating frame 88 with nuts 94; the other four rollers 96 are mounted in subframes 98 bolted to the floating frame 88. It is the purpose of the floating frame 88 and the rollers 92 and 96 mounted therein to always maintain the drive gear 80 and the rack 26 in pitch line contact as they, as a pair, follow an orbital path through space as will be explained.

An intermediate shaft 100 is journalled in the crank 76, through bearings 102 and 104, on the centerline between output shaft 72 and the crankpin 78, but not necessarily midway between them. At one end, this intermediate shaft 100 carries a gear 106 which is formed and positioned to mesh with the stationary gear 70 concentric about axis $A_0$. At its other end, the intermediate shaft, which rotates on an axis $A_2$, eccentrically mounts a roller 108 concentric about an axis $A_3$ displaced from axis $A_2$. This roller 108 operates in a close fitting radial slot 110 in the drive gear 80. A dirt shield 112 is used to cover the gears 70 and 106 and is fastened to the crank 76. In this embodiment, the pitch diameter of the gear 70 is exactly twice the pitch diameter of the gear 106; therefore, as the crank 76 is rotated with the shaft 72 through one revolution about axis $A_0$, the gear 106, shaft 100, and roller 108 rotate two times about axis $A_2$ with respect to the rotating crank 76. Other integral ratios or near integral ratios can also be used as will be subsequently explained. It can be seen that if the eccentricity between axes $A_3$ and $A_2$ were zero, the roller 108, acting in slot 110, would effectively prevent gear 80 from rotating on the crankpin 78 as the crank 76 was rotated about axis $A_0$. As it is, with a slight eccentricity between axes $A_2$ and $A_3$, the rotation of crank 76 about axis $A_0$ and the resultant planetary rotation of gear 106, shaft 100, and the eccentric motion of roller 108 on axis $A_3$ about axis $A_2$, causes the gear 80 to oscillate through some small angle on crankpin 78. The amplitude of this oscillation is determined by the eccentricity between the axis $A_2$ of shaft 100 and axis $A_3$ of roller 108. The frequency of this oscillation is controlled by the ratio of the gear 106 to 70, as noted earlier. Therefore, as the crank 76 makes one revolution on axis $A_0$ with shaft 72, the crankpin 78 traces a full circle while the gear 80 oscillates through two cycles on the crankpin 78 on the moving axis $A_1$. The effect of this oscillation on the overall path traversed by the transfer ladder assembly will be subsequently evaluated.

FIG. 12 is a qualitative schematic diagram which will be helpful in visualizing the general behavior of the lift and lower portions of the movement of the transfer ladder assembly. The centerlines of shaft 46 and 72 are noted by fixed markers. It has been previously noted that both gear reducers 42 and 64 have the same ratios and are mechanically connected through their respective input shafts by a coupling shaft 68. Therefore, their output shafts rotate in synchronism as do the cranks 50 and 76 attached thereto. Temporarily assuming gear 70 is freely journalled on crankpin 78, and the transfer ladder assembly 8 is confined to only vertical motion, the position of this assembly is shown in three arbitrary positions. It will be noted that the shafts 46 and 72 are at different heights, that the roller 52 and gear 76 are of different diameters, and that the channel assembly 18 and the rack 26 are mounted at different heights with respect to the transfer ladder assembly 8. However, if all these variables are combined such that the transfer ladder assembly 8 is horizontal at some given point, with both cranks 50 and 76 (which are of equal length) in the same angular position, then the transfer ladder assembly 8 will remain horizontal for all equal angular positions of the cranks 50 and 76. FIG. 12 shows the transfer ladder assembly 8, with the cranks 50 and 76 in their bottom-most position noted 50B and 76B, also rotated 90° clockwise from their bottom-most position noted 50M and 76M, and then at their top-most position, rotated a second 90° clockwise from their mid-position, noted 50T and 76T. The corresponding positions of all involved elements are also suffixed B for their bottom-most position, M for their mid-position, and T for their top-most position. It is easily seen, from FIG. 12, that the transfer ladder assembly 8 remains horizontal, as both cranks 50 and 76 rotate in unison.

The total transfer path motion will be determined as parametric equations, in which the vertical position will be established as a function of crank angle, and the horizontal position will also be determined as a function of crank angle. Between them, the total path configuration can be established.

FIG. 13 is the schematic representation of the shaft 72, shown by axis $A_0$, the crank 76, shown by its length R from $A_0$ to $A_1$ and gear 80; the object of the analysis is to find the vertical movement, Y, as a function of the crank rotation angle $\theta$, starting from its lowest position. The length of crank 76 is defined as R and the radius of gear 80 is defined as $R_1$. With this in mind, it can be seen that after the crank has rotated the gear 80 through an angle $\theta$ to the position shown by 80A that:

$H_1 = R - R_1$
$H_2 = R \cos \theta - R_1$
$Y = H_1 - H_2$
$Y = R - R_1 - (R \cos \theta - R_1)$
$Y = R - R \cos \theta$
$Y = R(1 - \cos \theta)$ Equation (1) is then a parametric equation which expresses the vertical displacement Y as a function of the crank angle $\theta$.

Figure 14:
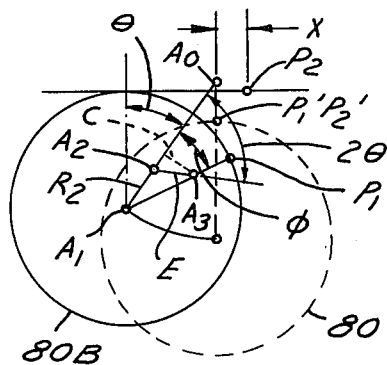
FIG. 14, a schematic diagram for determining the horizontal position parametric equation.

FIG. 14 is the schematic diagram required for determining the horizontal movement, X, as a function of the angle of rotation, $\theta$, of the crank 76 from its starting position which is its lowest position. The gear moves from its initial position at 80 to its position at 80B. The following elements, distances and angles are defined:

The shaft 72 is represented by its centerline $A_0$;
The crankpin 78 is represented by its centerline $A_1$;
The intermediate shaft 100 is represented by its centerline $A_2$;
The roller 108 is represented by its centerline $A_3$;
R=the length of crank 76 from axis $A_0$ to $A_1$ (as in FIG. 13);
$R_1$=the radius of the gear 80;
$R_2$=the distance along crank 76 from the crankpin 78 ($A_1$) to the intermediate shaft 100 ($A_2$);
E=the eccentricity of the roller 108 ($A_3$) on the intermediate shaft 100 ($A_2$);
$\theta$=the angle through which the crank 76 rotates from its lowermost position;
$\phi$=the angle through which the gear 80 rotates on the crankpin 78 ($A_1$) while the crank 76 (R) rotates through the aforesaid angle $\theta$.

Because of the gear ratio between gear 106 and stationary gear 70, it can be seen that E rotates through an angle $2\theta$ when R rotates through the angle $\theta$. The slot 110 in the gear 80 maintains its centerline through the centerline of the roller 108 ($A_3$).

A dotted construction line C is seen to be:
$c = E \sin 2\theta$

From this it can be seen that $$\phi = \tan^{-1}\left(\frac{C}{R_2 + E \cos 2\theta}\right) \quad (2)$$

$$\phi = \tan^{-1}\left(\frac{E \sin 2\theta}{R_2 + E \cos 2\theta}\right)$$

Equation (2) defines the angle that the gear 80 is displaced on the crankpin 78 as a function of the crank rotation angle, $\theta$, In the initial position of the gear 80, the point of tangency between the horizontal gear rack 26 and the gear 80 is noted as $P_1'$ and $P_2'$, where $P_1'$ is on the gear 80 and $P_2'$ is on the rack.

After the crank has rotated through the angle $\theta$, these points are now shown as $P_1$ on the gear, and $P_2$ on the rack. Since the rack is still horizontal (as shown by FIG. 12), it follows that the relative slip free rolling of the rack and the gear demands that the distance from the new point of pitch line tangency of gear and rack to point $P_2$ on the rack be exactly equal to the length of arc from the new point of tangency to the point $P_1$ on the gear. This arc can be seen to be subtended by the angle, $\theta + \phi$. The length of this arc is therefore $R_1(\theta + \phi)$.

Superimposed on this rolling action, the point of tangency between gear and rack has shifted in the opposite direction through a distance $R \sin \theta$.

Therefore, the amount that the point $P_2$ has shifted to the right from its initial position as defined by X is $X = R_1(\theta + \phi) - R \sin \theta$ or $X = R_1\theta - R \sin \theta + R_1\phi$
$X = R_1(\theta - R/R_1 \sin \theta) + R_1\phi$ substituting equation (2)

$$X = R_1\left(\theta - \frac{R}{R_1} \sin \theta\right) + R_1 \tan^{-1}\left(\frac{E \sin 2\theta}{R_2 + E \cos 2\theta}\right) \quad (3)$$

Equation (3) is then a parametric equation which expresses the horizontal displacement X as a function of the crank angle $\theta$. For any given value of $\theta$, a specific value of X can be calculated and a specific value of Y can be similarly calculated from equation (1) to establish the resultant path.

From equation (3), $X=0$ when $\theta=0$; after one complete revolution of the crank, $\theta=2\pi$ (radians) and X is found to be $2\pi R_1$. Therefore, it is observed that the distance moved by the rack during one revolution of the crank is the pitch circumference of the gear, independent of the values of R (crank length) or E (roller eccentricity).

For calculating convenience, the gear radius $R_1$ is set to 1, which yields a stroke of $2\pi$ units. The results so determined can then be "scaled" up or down to meet the application requirements. With $R_1=1$, equation (3) becomes:

$$X = \theta - R \sin \theta + \tan^{-1}\left(\frac{E \sin 2\theta}{R_2 + E \cos 2\theta}\right) \quad (4)$$

It may also be noted that if E is set to 0, and the crank length R also set equal to 1, then $X = \theta - \sin \theta$ This, together with the parametric equation (1) for Y are the parametric equations for a cycloid generated by a circle of unit radius.

The introduction of the values E and R permit a great deal of design flexibility, which is basically accomplished by a judicious choice of these values and then determining the path shape. In a broad sense, the terms containing the values $2\theta$ introduce a second harmonic variation to a basically cycloidal path. This is extremely useful in significantly lengthening the substantially vertical motion, which is reached only instantaneously by a true cycloid, at the end of a stroke.

Figure 15:
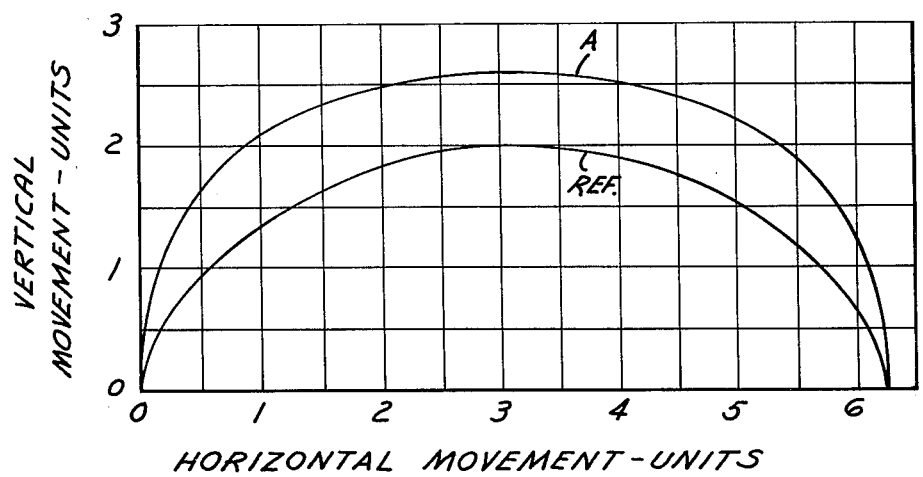
FIG. 15, a scale diagram of one of many path forms available compared to a reference cycloidal path form.

FIG. 15 clearly illustrates this effect. The path marked REF is the path of a cycloid generated by a unit radius circle. It would also be the path generated by the transfer ladder assembly if the crank length and gear radius were the same, and the roller eccentricity, E, were 0.

In FIG. 15, the curve marked A is based on a value of R=1.3, $R_2$=0.55 and E=0.083, again scaled to a unit gear radius. By comparing A to the REF curve, it can be seen that the total lift has been increased relative to the REF, pure cycloidal, path. More important, however, the ends of the curve A are significantly more vertical over a much larger fraction of the total lift height. This is of considerable value in operations where workpieces must be loaded and unloaded into deep machine fixtures, to which this application has addressed itself.

Many other combinations of R, $R_2$ and E can be used after a systematic investigation of their effect on curve contours.

Figure 16:
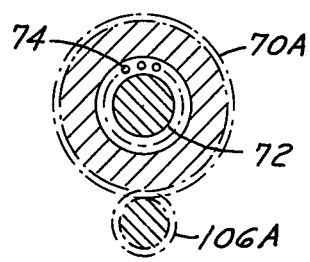
FIG. 16, a section analogous to FIG. 10 but showing the method of third harmonic addition.

In addition to the path modifications made possible by varying R, $R_2$, and E, it is also possible to vary the "order" of the higher harmonic being added by changing the gear ratio between gear 70 and gear 106. The ratio illustrated in FIG. 10 is 2:1. Referring to FIG. 16, which is analogous to FIG. 10, a 3:1 ratio is illustrated. Similarly, other integral values may be employed, although it has been found that the 2:1 and 3:1 ratios are most useful.

Figure 17:
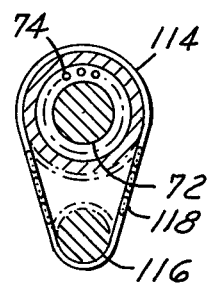
FIG. 17, a section analogous to FIG. 10 but showing a first alternate method of adding the higher harmonic.

It is also possible to drive the intermediate shaft 100 by means other than the gears illustrated in FIGS. 10 and 16. FIG. 17 shows a chain and sprocket arrangement; referring to this figure, a stationary sprocket 114 replaces the gear 70, and a sprocket 116 replaces the gear 106 on shaft 100. These are connected together by a chain 118 so shown. It will be noted that this makes the shaft 100 rotate in the direction opposite from that caused by the gears. This is compensated for by reversing, by 180°, the eccentricity of the roller 108 on the shaft 100 and requires a new but comparable equation to express the parametric horizontal motion. Similarly, the same effect can be achieved by using a stationary internal gear concentric about shaft 72 cooperating with a gear on shaft 100.

Figure 18:
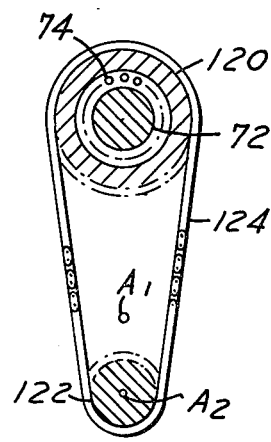
FIG. 18, a schematic section analogous to FIG. 10 but showing a second alternate method of adding the higher harmonic.

Another alternate construction is shown in FIG. 18. This presumes that the crank 76 is lengthened beyond the crankpin 78, and the shaft 100 mounted in the crank outboard of the crankpin. The shaft 100 is then driven by a sprocket 122 mounted thereon from a stationary sprocket 120 mounted concentric with the shaft 72, through a chain 124. The slot 110 must then be repositioned in the gear 80.

Indeed, it may be noted that it is not necessary for the shaft 72, crankpin 78, and shaft 100 to be colinear in any case. Provided only that the slot 110 in gear 80 be properly positioned, it is possible to position the shaft 100 anywhere on crank 76 such that the circle traced by the roller 108 lie within the root diameter circle of gear 80. And even this limitation can be eliminated by placing the slot 100 in a plate adjacent to and connected to gear 80 and having a larger diameter than gear 80.

What is claimed is:

1. In a transfer system in which the motions required of a transfer member are generally, in sequence, a lift motion, a forward transfer motion, and a lowering motion, a modified cycloidal path generating mechanism for said transfer member utilizing higher harmonic component addition to achieve significantly longer substantially vertical movements at the ends of the cycle than an unmodified cycloidal path generating mechanism, comprising:
    (a) a first transfer mechanism comprising:
        (1) a frame,
        (2) first shaft means journalled in said frame and rotating about a first axis,
        (3) first crank means mounted on said first shaft means,
        (4) gear means journalled on said first crank means for oscillation about a second axis displaced from said first axis,
        (5) oscillating means operative between said frame and said gear means for oscillating said gear means about said second axis at a frequency which is an integral multiple of the frequency of rotation of said first crank means about said first axis,
        (6) rack means mounted on said transfer member in pitch line contact with said gear means,
        (7) floating frame means operative between said rack means and said gear means for maintaining pitch line contact therebetween, and
    (b) a second transfer mechanism comprising:
        (1) second shaft means journalled in said frame parallel to said first shaft means and rotating about a third axis,
        (2) second crank means mounted on said second shaft means,
        (3) connecting means mounted on said second crank means and rotatable about a fourth axis displaced from said third axis a distance equal to the distance between said first axis and said second axis,
        (4) slide means mounted on said transfer member supported by said connecting means, and
    (c) drive means interconnecting said first shaft means and said second shaft means to drive said first shaft means and said second shaft means in synchronism and at equal angular velocities.

2. A transfer system as in claim 1 in which said oscillating means comprises a third shaft journalled in said first crank means rotating about a fifth axis, eccentrically mounting a rotating member rotating about a sixth axis displaced from said fifth axis with said rotating member operatively associated with said gear means.

3. A transfer system as in claim 2 in which said rotating member operates in a slot in said gear means.

4. A transfer system as in claim 2 in which said third shaft is driven by a second gear, mounted thereon, formed to mesh with a stationary gear mounted on said frame concentric with said first shaft means and in which the pitch diameter of said stationary gear is an integral multiple of the pitch diameter of said second gear.

5. A transfer system as in claim 2 in which said third shaft is driven by a toothed member operatively associated with a second toothed member mounted concentric with said first shaft means and said toothed members are interconnected by flexible driving means adapted to engage said toothed members.

6. A transfer system as in claim 5 in which said toothed members are sprockets and said flexible driving means comprises a chain adapted to engage said sprockets.

7. A transfer system as in claim 1 in which said connecting means mounted on said second crank means comprises a roller and said slide means comprises a slot in said first transfer mechanism engaged by said roller.

* * * * *